Jan. 16, 1934.  L. M. HILE  1,943,824
RECTANGULAR BASKET
Filed July 21, 1930   2 Sheets-Sheet 1

Inventor:
Leslie M. Hile

Jan. 16, 1934.   L. M. HILE   1,943,824
RECTANGULAR BASKET
Filed July 21, 1930   2 Sheets-Sheet 2

Inventor:
Leslie M. Hile
By Arthur F. Durand
Atty

Patented Jan. 16, 1934

1,943,824

UNITED STATES PATENT OFFICE 1,943,824

RECTANGULAR BASKET

Leslie M. Hile, Benton Harbor, Mich.

Application July 21, 1930. Serial No. 469,542

8 Claims. (Cl. 217—122)

This invention relates to baskets, and more particularly to baskets which are rectangular, whereby baskets of this kind, when filled, may be placed close together with no space between them, when viewed from above, whereby less space is required for the transportation of loaded baskets of this kind.

Generally stated, the object of the invention is to provide a novel and improved construction whereby baskets of the foregoing general character are made from splints or staves that each extend integrally from the top of the basket and down one side thereof and across the bottom and up the other side to the top of the basket, whereby a flat, or substantially flat, bottom is provided for the basket, and whereby the basket is tapered downwardly to permit the nesting of the baskets for shipment or storage.

It is also an object to provide certain details and features of construction tending to increase the general efficiency and the desirability of a rectangular basket of this particular construction.

To the foregoing and other useful ends, the invention consists in matters hereinafter set forth and claimed and shown in the accompanying drawings, in which—

Figure 1:
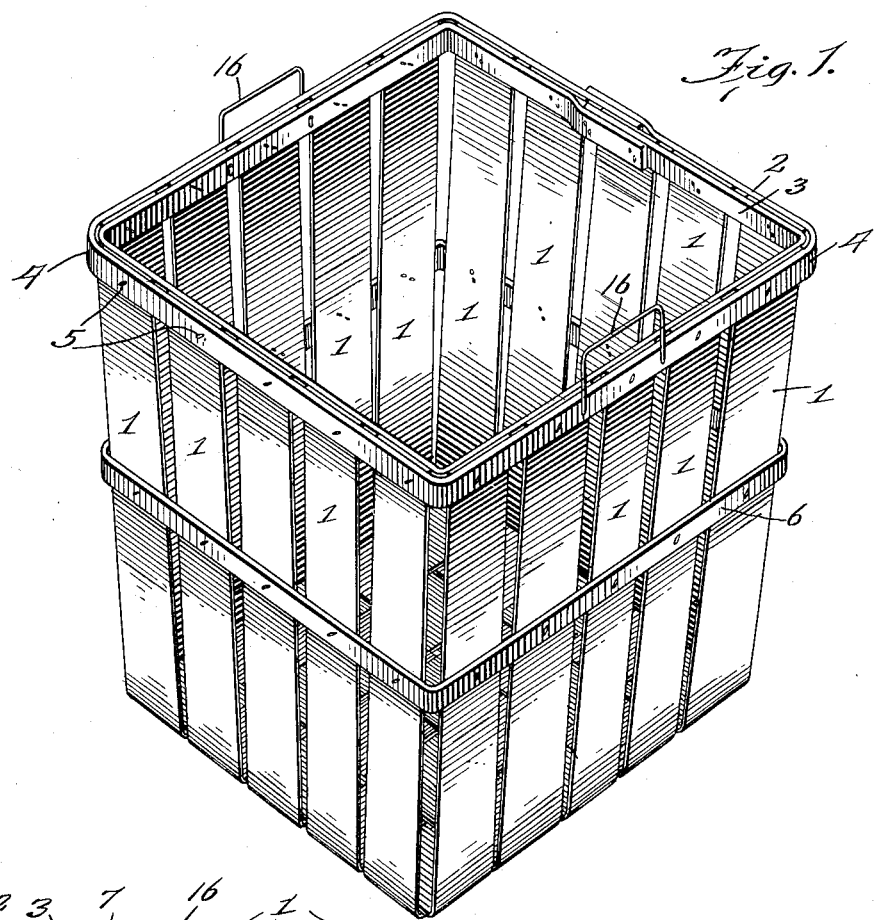
Fig. 1 is a perspective of a basket embodying the principles of the invention.
Figure 2:
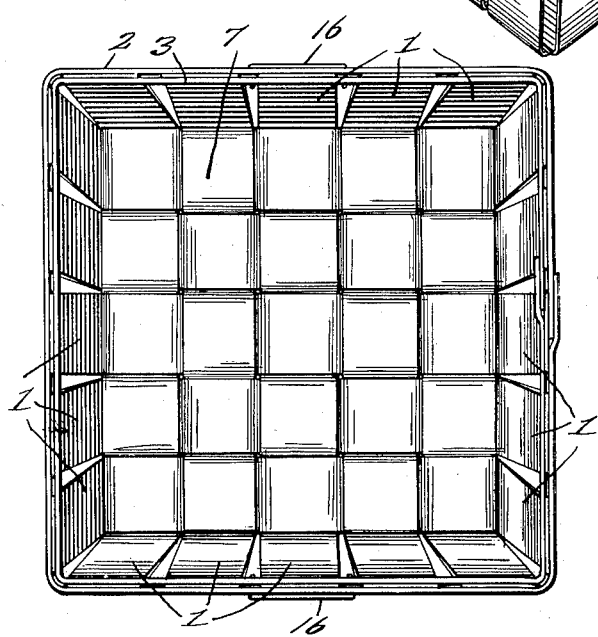
Fig. 2 is a plan view of said basket.
Figure 4:
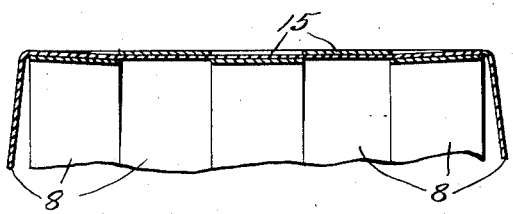
Fig. 4 is a detail sectional view of the bottom of the basket shown in Fig. 3.
Figure 5:
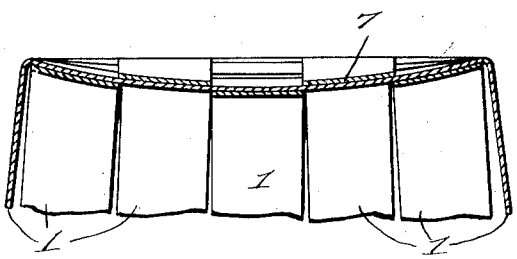
Fig. 5 is a similar view, showing a somewhat less flat bottom.

As thus illustrated, referring to Figs. 1, 2 and 5, the invention comprises a rectangular basket having flat and downwardly tapered side walls composed of splints or staves 1, as shown. Each stave extends integrally from the top of the basket to the bottom thereof, across the said bottom, the bottom having a basket weave formation, and then up the other side of the basket to the top, whereby each stave is bent at the lower corners of the basket. The top of the basket has outer and inner hoops 2 and 3, as shown, bent in such a manner that they are slightly rounded at the corners 4, and fastened in place by staples 5 inserted through both hoops and the staves. In this case, the staves are spaced slightly apart to provide a ventilated basket, whereby the staves are each of uniform width throughout the length thereof. The basket also has an outside middle hoop 6, stapled or otherwise fastened to the side walls, and the bottom 7 of the basket is formed by interlacing the staves or splints, in the form of a basket weave, so to speak, preferably in a manner to provide a substantially flat bottom for the basket. However, as shown in Fig. 5, the bottom 7 is bulged upwardly slightly, and is less flat than the bottom shown in Fig. 4 of the drawings, it being understood that in Figs. 4 and 5 the basket is shown upside down.

Figure 3:
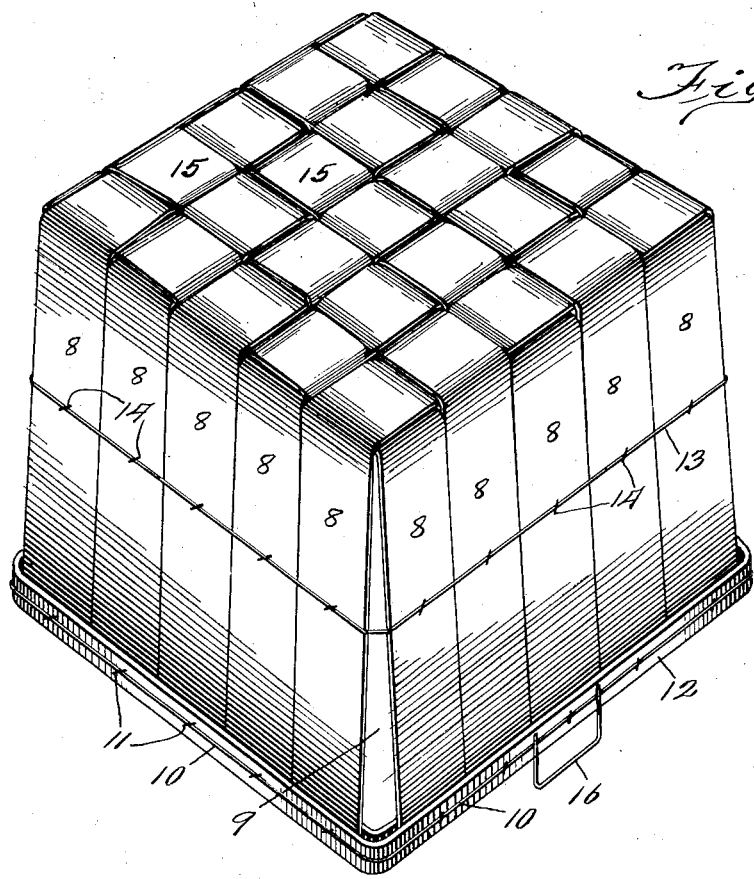
Fig. 3 is an upside down perspective view of the basket, showing another form of the invention.

In Figs. 3 and 4 of the drawings, the flat side walls of the basket are composed of staves 8 that are arranged close together, or edge to edge, instead of being spaced apart. In this way, the side wall openings are confined to the corners 9, but the general effect is that of a basket with downwardly tapered side walls, whereby this basket, like the one shown in Fig. 1, may be nested with other baskets of the same kind. Furthermore, in Figs. 3 and 4, a binding wire 10 is held in place by staples 11 upon the outer surface of the outside top hoop 12 of the basket, thereby reinforcing the top hoop construction of the basket. In addition, a binding wire 13 is applied to the basket about midway between the top and bottom thereof, to encircle the basket, as does the wire 10, which is held in place by staples 14, as shown. In this case, as shown in Fig. 4, the bottom 15 is perfectly flat.

The baskets may be provided with handles 16 of any suitable character, as shown in Figs. 1 and 3 of the drawings.

Thus, in accordance with the invention, a rectangular basket is provided having flat sides and an interwoven bottom formed of staves or splints which extend integrally down one side of the basket and across the bottom and up the other side thereof. The staves can have any suitable arrangement at the bottom of the basket, but they are preferably interwoven, as shown and described. Baskets of this kind take up less space, when they are placed side by side for shipment or storage, and there is practically no space between them when viewed from above. Also, when baskets of this kind are filled, they can be placed one on top of another, advantageously, as the bottoms are flat, or practically flat.

It is obvious, of course, that the basket thus constructed is conveniently formed from a flat blank made from the staves, the latter being arranged in two groups, at right angles to each other, and with the members of one group interwoven with the members of the other group where the two groups cross each other, thus leaving the end portions of the staves free, whereby the blank forms a sort of cross with the arms thereof of equal length. Then, obviously, the end portions of the staves are moved into the positions which they must occupy to provide the outwardly inclined flat side walls of the basket, and the hoops are then applied in the desired manner. In this way, the rectangular bottom of the basket has a true basket-weave formation, the staves being interwoven in the manner commonly called a basket weave.

What I claim as my invention is:

1. A rectangular basket comprising four outwardly inclined side walls composed of staves each having integral end and intermediate portions of uniform width between its ends, extending integrally from the top of the basket down one side thereof and across the bottom and up the opposite side to said top, for each of the four flat sides of the basket, with the staves interwoven in the bottom to form a square mat that will rest directly on the floor, whereby the staves are in two groups forming across with arms of equal width and length, said staves being bent where the four flat sides join the rectangular bottom of the basket, each side wall being flat from top to bottom thereof, and the top of the basket being larger than the bottom thereof, whereby baskets of this kind are adapted to nest together for shipment or storage, each stave being separate from the others from end to end thereof, and the intermediate portions of the staves being arranged to form the rectangular bottom of the basket, in combination with means applied after the bending of the staves into basket form to maintain the basket formation.

2. A basket as specified in claim 1, comprising inside and outside rectangular hoops for said sides, encircling the basket integrally and continuously except at one side thereof, and staples securing said hoops and staves together.

3. A basket as specified in claim 1, comprising inside and outside rectangular hoops for said sides, encircling the basket integrally and continuously except at one side thereof, and fasteners securing said hoops and staves together, said hoops comprising binding wires stapled in place around the basket.

4. A basket as specified in claim 1, comprising inside and outside rectangular hoops for said sides, encircling the basket integrally and continuously except at one side thereof, and fasteners securing said hoops and staves together, said hoops comprising flat strips bent at right angles at the corners of the basket.

5. A basket as specified in claim 1, comprising inside and outside rectangular hoops for said sides, encircling the basket integrally and continuously except at one side thereof, and fasteners securing said hoops and staves together, said hoops comprising flat strips and binding wires bent at right angles at the corners and stapled in place around the basket.

6. A structure as specified in claim 1, said square bottom being dipped upwardly between the four straight edges thereof, so that it is convex on top and concave below.

7. A structure as specified in claim 1, the staves having their edges butted tightly together in the sides of the basket.

8. A structure as specified in claim 1, the staves having downwardly tapering spaces between their edges in the sides of the basket.

LESLIE M. HILE.